Dec. 8, 1953    E. C. VOSS    2,661,956
SEED HOPPER VALVE OPERATING MECHANISM
Filed April 5, 1949    3 Sheets-Sheet 3
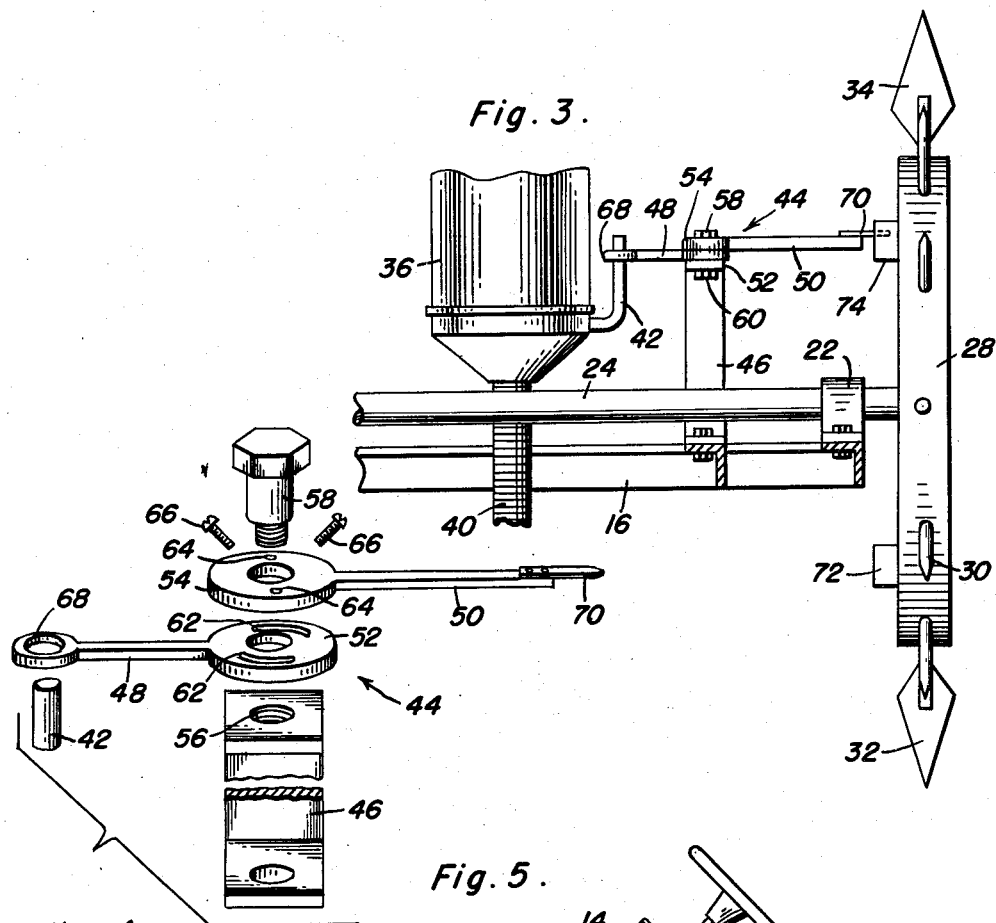
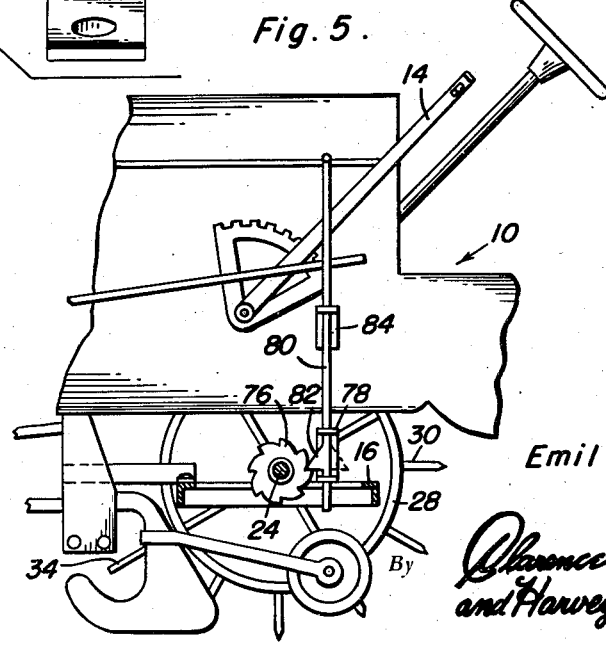
Inventor
Emil C. Voss Patented Dec. 8, 1953

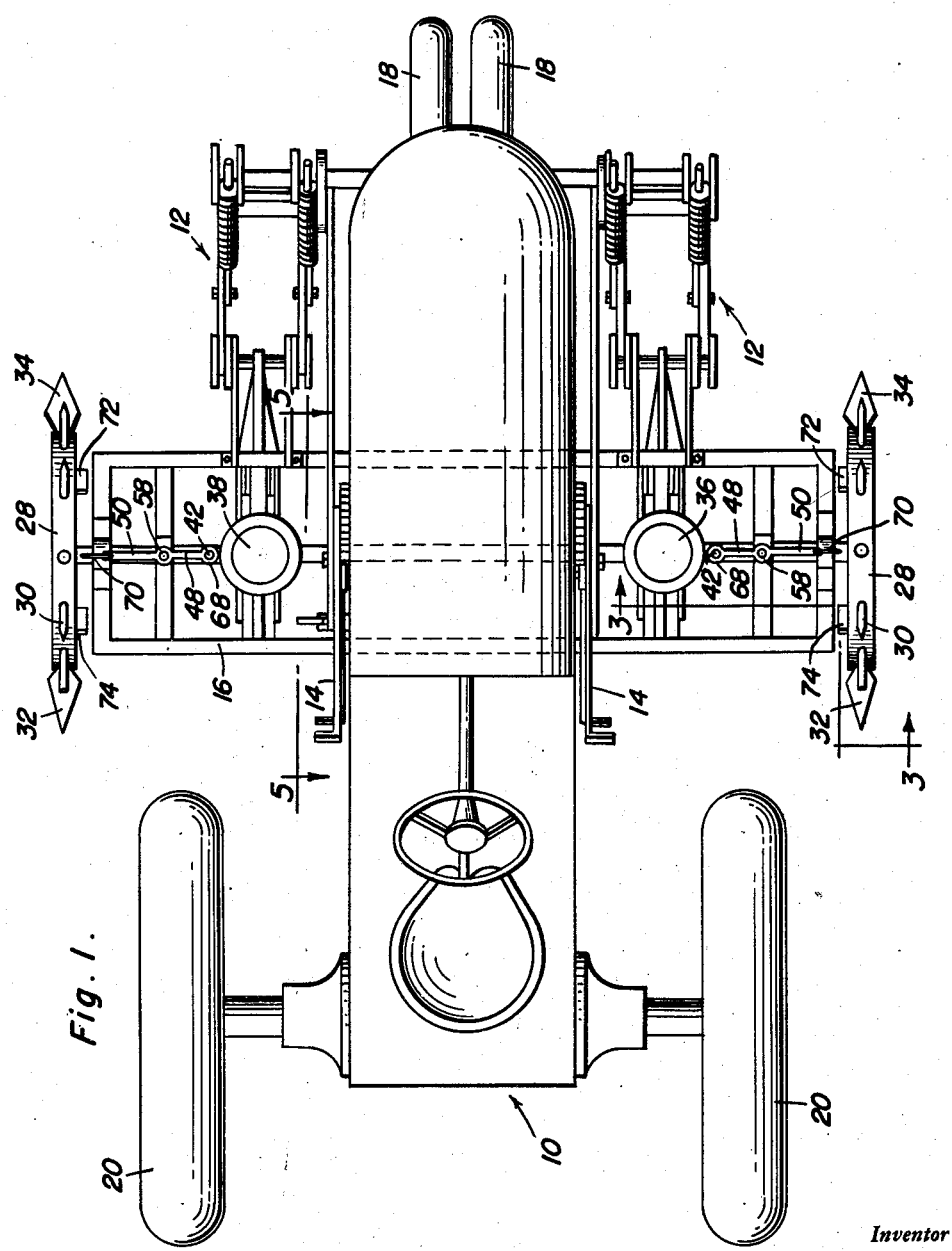

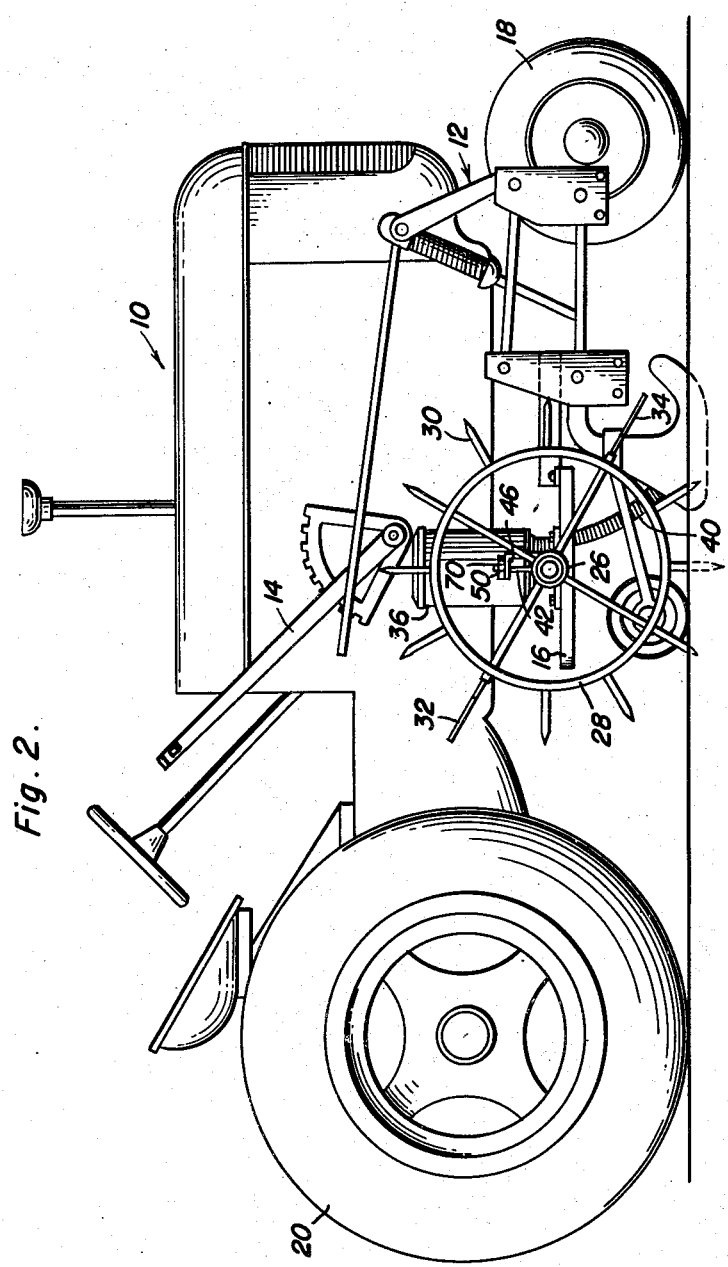

2,661,956

UNITED STATES PATENT OFFICE 2,661,956

SEED HOPPER VALVE OPERATING MECHANISM

Emil C. Voss, Davenport, Iowa

Application April 5, 1949, Serial No. 85,692

1 Claim. (Cl. 275—9)

An important object of the present invention is to provide an attachment for planters having seed dispensing containers and valve means controlling the seed dispensing containers, and embodying novel and improved means for tripping the valve means at predetermined intervals during the movement of a planter on which the present invention is applied.

Yet another important object of the present invention is to provide a device of the aforementioned character that is quickly and readily applied to a planter so that an operator can view the attachment in a convenient and comfortable manner.

A further object of the present invention is to provide an attachment for tractor corn planters that is simple and practical in construction, strong and reliable in use, small and compact in structure, neat and attractive in appearance, efficient and durable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of a tractor corn planter and showing the present invention applied thereto;

Figure 2 is a side elevational view of Figure 1;

Figure 3 is an enlarged transverse vertical sectional view taken substantially on the plane of section line 3—3 of Figure 1;

Figure 4 is a group perspective view of one of the trip mechanisms used in conjunction with the present invention; and Figure 5 is an enlarged, fragmentary, longitudinal vertical sectional view taken substantially on the plane of section line 5—5 of Figure 1.

Referring now to the drawings in detail, wherein for the purpose of illustration, there is disclosed a preferred embodiment of the present invention, the numeral 10 represents a tractor or planting machine, generally, having the usual plow raising and lowering mechanism 12 including a manually operated lever 14 for actuating the lift mechanism.

Suitably secured to the lift mechanism 12 for raising and lowering movement with the lift mechanism, is an elongated substantially rectangular and open frame 16 that is disposed transversely of the tractor and between the forward wheels 18 and rear wheels 20.

Bearings 22 are mounted on the frame 16 and rotatably support a shaft 24. The ends of the shaft project outwardly from the sides of the tractor and support the hubs 26 of a pair of preferably spoked wheels or rotary members 28. A plurality of circumferentially spaced radially projecting arms or spikes 30 are fixed to the wheels 28 and are spaced equidistant from each other.

A pair of substantially flat diamond shaped diggers or blades 32 and 34 are fixed to a diametrically opposite pair of arms 30 for each wheel and have a purpose later to be more fully described.

Planters, such as the type illustrated in the drawings, are provided with dispensers or containers 36 and 38 that are disposed adjacent the sides of the planter or tractor and between the forward and rear wheels 18 and 20. The containers 36 and 38 are provided with flexible delivery pipes or conduits 40 through which seeds are supplied to the ground or ditches made in the ground.

Horizontally swingable or slidable valves (not shown) are mounted in the containers 36 and 38 and when moved in one direction will permit seeds or material in the containers to pass outwardly through the conduits. The valves are normally urged to a closed position by resilient means. Since the valves and the means biasing the same to their closed position form no specific part of the present invention, and are modified on various types of seeders, they are not illustrated. However, the angulated operating levers 42 for the valves are shown since they have a definite cooperation with the trip mechanisms 44 utilized in conjunction with the instant structure.

The trip mechanisms 44 are mounted on brackets 46 secured to and rising from the frame 16 and each of the trip mechanisms or valve actuators comprise a pair of arms 48 and 50 that are rigidly secured to or which form integral parts of circular plates 52 and 54 respectively. The plates 52 and 54 are centrally apertured to register with openings 56 provided in the brackets 46.

Pivot pins or bolts 58 extend through the apertures in the plates 52 and 54 and the openings 56 to retain the arms relative to the brackets 46. The threaded ends of the bolts 58 receive nuts 60 that hold the bolts in position to the brackets.

The plates 52 are each provided with a pair of arcuate, diametrical opposed slots 62 that oppose a pair of diametrically opposed openings 64 formed in each of the plates 54. Fasteners 66 extend through the slots 62 and are threaded in the openings 64 so that the arms 48 and 50 may be swung as a unit as the wheels 28 rotate in a forward direction with the fasteners 66 engaging an end of each slot 62. During rotation of the wheels 28 in a rearward direction, the lugs 74 will engage the fingers 70 to swing arms 50 and the fasteners 66 will ride in slots 62 without imparting swinging motion to arms 48.

The arms 48 are secured to rings or eye members 68 that receive the upstanding portions of the levers 42, as illustrated best in Figure 3 of the drawings. Contact fingers 70 are fixed to and project outwardly from the arms 50 for engaging a pair of diametrically opposed arms or lugs 72 and 74 fixed to each of the wheels 28.

Means is provided for holding the shaft 24 against rotation and this means comprises a ratchet wheel or toothed member 76 that is suitably fixed to the shaft 24. A channel bracket 78 is secured to the frame 16 and rotatably supports a substantially vertical rod 80 to which there is fixed a locking member or dog 82. The rod 80 extends well above the frame 16, is disposed adjacent one side of the tractor, and is received by a bearing or bracket 84 secured to one side of the tractor.

In practical use of the present invention, as the tractor moves forwardly, the spikes 30 will dig into the ground causing the wheels 28 to rotate. After the wheels 28 have rotated a predetermined distance, the arms or lugs (either 72 or 74) will engage the contact fingers 70 to impart a swinging motion to the arms 48 and 50 thereby actuating the valves mounted in the containers 36 and 38 to their open position and seeds or the like will pass from the containers, into the conduits 40 and hence to the ground.

When it is desired to hold the shaft 24 and wheels 28 against rotation, the dog 82 is swung from its dotted line position to its full line position, as shown in Figure 5, so that the dog 82 engages the ratchet 76. It being understood that the frame 16 is raised whereby the spikes 30 will not engage the ground.

It should be noted, that as the wheels 28 rotate, the diggers 32 and 34 will extend into the ground and make holes larger than the holes made by the spikes 30. These holes form guides in the following manner:

Assuming that the tractor is moving from left to right, there will exist a plurality of holes formed by the diggers 32 and 34, or right and left holes. After the tractor has reached its turning point, at the end of a row, the tractor is turned to the left to move from right to left and a digger on the wheel mounted on the left of the tractor is placed in the last hole made by a digger on the left hand side wheel of the tractor.

The markers or diggers 32 and 34 are disposed adjacent the arms 72 and 74 so that an operator can observe where seeds are placed in or on the ground.

The present invention does not attempt to claim the tractor 10, the raising and lowering mechanism 12 or the operating lever 14, but is merely an attachment therefor. The instant structure is secured in any suitable manner to the mechanism 12 to be raised and lowered therewith and since the raising and lowering mechanism of various makes of tractors are different the present invention is not to be limited to a particular attaching or mounting means for the frame.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a grain planter including a seed dispenser having a valve provided with an operating lever that includes an upstanding end portion, an operating mechanism for the valve comprising a mounting bracket having a horizontal part with a vertical opening therein, first and second horizontally forwardly and rearwardly swingable arms having flat and enlarged inner end portions disposed one above the other in contacting relationship, a common pivot for the arms extending through the inner end portions of the arms and through the opening in said bracket, interconnecting means between the inner end portions of the arms causing swinging movement of the arms as a unit with forward swinging movement of the first arm and permitting rear swinging movement of the first arm independently of the second arm, a rigid eye carried by the second arm and receiving the upstanding end portion of the valve lever, and a contact finger secured to the first arm for engaging a rotary member to impart swinging movement to the arms, said interconnecting means comprising a pair of bolts threaded through the inner end portion of said first arm, said inner end portion of said second arm having a pair of arcuate slots therein receiving said bolts, each of said bolts engaging an end of each slot when the arms are disposed in alignment to cause forward swinging movement of the arms as a unit, said bolts riding in said slots upon rearward swinging movement of said first arm relative to the second arm.

EMIL C. VOSS.

References Cited in the file of this patent

UNITED STATES PATENTS

| Number | Name | Date |
|---|---|---|
| 270,428 | Hanson | Jan. 9, 1883 |
| 452,709 | Huffman | May 19, 1891 |
| 487,506 | Ames | Dec. 6, 1892 |
| 574,578 | Sattley et al. | Jan. 5, 1897 |
| 797,569 | Gatewood et al. | Aug. 22, 1905 |
| 1,073,749 | Gillespie | Sept. 23, 1913 |
| 1,157,709 | Maher | Oct. 26, 1915 |
| 1,241,123 | Johnson | Sept. 25, 1917 |
| 1,593,070 | Gross | July 20, 1926 |
| 1,706,215 | Davidson | Mar. 19, 1929 |
| 2,054,513 | Kriegbaum et al. | Sept. 15, 1936 |
| 2,119,087 | Stout | May 31, 1938 |
| 2,155,735 | Parks et al. | Apr. 25, 1939 |
| 2,167,230 | Avigdor | July 25, 1939 |
| 2,276,697 | Peterson | Mar. 17, 1942 |
| 2,402,828 | Michael | June 25, 1946 |

FOREIGN PATENTS

| Number | Country | Date |
|---|---|---|
| 209,161 | Great Britain | Jan. 3, 1924 |